United States Patent [19]
Pickave

[11] Patent Number: 5,000,083
[45] Date of Patent: Mar. 19, 1991

[54] SALAMANDER-TYPE BROILER/COOKER

[75] Inventor: Hermann Pickave, Wolfenbüttel, Fed. Rep. of Germany

[73] Assignee: MKN Maschinenfabrik Kurt Neubauer GmbH & Co., Wolfenbuttel, Fed. Rep. of Germany

[21] Appl. No.: 566,544

[22] Filed: Aug. 13, 1990

[30] Foreign Application Priority Data

Aug. 14, 1989 [EP] European Pat. Off. ........ 89114995/7

[51] Int. Cl.⁵ .................... A47J 37/00; A47J 37/06
[52] U.S. Cl. ............................. 99/327; 99/332; 99/337; 99/344; 99/385; 99/390; 99/401; 392/432; 219/405; 219/461
[58] Field of Search .............. 99/326, 327, 331, 332, 99/337, 339, 342, 344, 358, 385, 389, 390, 393, 396, 401, 449, 451; 219/347, 348, 402–405, 461, 475

[56] References Cited

U.S. PATENT DOCUMENTS

| | | | |
|---|---|---|---|
| 1,179,986 | 4/1916 | Warner | 219/404 |
| 2,764,664 | 3/1957 | Stewart | 219/405 |
| 3,146,692 | 9/1964 | Connolly et al. | 99/385 |
| 3,490,357 | 1/1970 | Lescure | 99/390 |
| 3,586,823 | 6/1971 | Schier | 99/401 |
| 3,610,885 | 10/1971 | Zingg | 219/461 |
| 3,732,803 | 5/1973 | Buxmann | 99/401 |
| 3,824,916 | 7/1974 | Green et al. | 99/337 |
| 4,020,323 | 4/1977 | Dills | 219/348 |
| 4,034,663 | 7/1977 | Jenn et al. | 219/461 |
| 4,487,116 | 12/1984 | Routhier | 99/339 |

FOREIGN PATENT DOCUMENTS 610747  5/1979  Fed. Rep. of Germany ........ 99/390

OTHER PUBLICATIONS

DM010450, "International Design Certificate", World Intellectual Property Organization, Strasse, Mar. 1988.

Primary Examiner—Timothy F. Simone
Attorney, Agent, or Firm—Herbert Dubno; Andrew Wilford

[57] ABSTRACT

A salamander-type overhead broiler/cooler has a base on a support adapted to hold a foodstuff to be heated, a heating unit vertically displaceable on the support energizable to radiate heat downward at the support, and a horizontal light curtain at a predetermined spacing fixed relative to and below the heating unit so that the light curtain can be broken by a foodstuff on the base when the unit is lowered. A motor is connected between the unit and the support for vertically displacing the unit and the light curtain on the support and a controller connected between the light curtain and the motor means arrests downward displacement of the unit when the light curtain is broken by a foodstuff on the base.

10 Claims, 2 Drawing Sheets

SALAMANDER-TYPE BROILER/COOKER

FIELD OF THE INVENTION

The present invention relates to a cooking/warming device that broils or heats from above. More particularly this invention concerns a commercial-duty salamander.

BACKGROUND OF THE INVENTION

A standard commercial-duty broiler/warmer called a salamander in the art and described in international design patent No. 010,450 has a heavy duty radiant heating unit that is carried in a housing that can be vertically displaced above a food-support surface in the manner described in German patent document 8,613,077, Swiss 610,747, and British 974,759. The food to be cooked or heated is placed on the surface and the heating unit is pulled down and energized to heat it from above. This unit can be used to broil steaks or chops, melt cheese on vegetables or soups, or simply reheat already cooked food, although the experienced chef can find many other uses.

The utility of such a unit is dependent on the experience of the person using it. This is because the vertical spacing between the heating unit and the food, and the amount of time the heat is to be applied is fairly critical, especially in view of the large heating capacity of a typical commercialkitchen salamander. Thus the device is quite difficult to use, and even an experienced chef will frequently undercook or burn something with it.

In addition this arrangement is fairly dangerous. If the heat is not turned off the high temperatures—about 250° C.—underneath it can lead to severe burns. Furthermore if the device is not fully raised when it is loaded or unloaded the person working it must slide the plates or food into a relatively narrow slot to put them in place. In addition if the device is set too low, it is possible not only to ruin the food being prepared, but to start a fire.

Finally these arrangements have other problems relating to their use. The massive heating unit is relatively bulky and difficult to position accurately, especially once it has gotten fairly greasy over the years. This tempts the user to leave it in the down position rather than to follow the safer course of opening it fully to load something in or take it out. Furthermore when the heating element is off it is difficult to see under it, and when the element is on the light supplied by the normally radiant heat is bad so that it is difficult to tell just what is happening. Since the device is used frequently, it is also common for the user to simply leave the heat on, wasting energy.

OBJECTS OF THE INVENTION

It is therefore an object of the present invention to provide an improved overhead broiler/cooker of the salamander type.

Another object is the provision of such an improved overhead broiler/cooker of the salamander type which overcomes the above-given disadvantages, that is which can be used even by relatively inexperienced personnel.

A further object is to provide a new salamander which gives easy access to and visibility of the food being prepared.

SUMMARY OF THE INVENTION

A salamander-type overhead broiler/cooker according to this invention has a base on a horizontal support adapted to hold a foodstuff to be heated, a heating unit vertically displaceable on the support energizable to radiate heat downward at the support, and a horizontal light curtain at a predetermined spacing fixed relative to and below the heating unit so that the light curtain can be broken by a foodstuff on the base when the unit is lowered. A motor is connected between the unit and the support for vertically displacing the unit and the light curtain on the support and a controller connected between the light curtain and the motor means arrests downward displacement of the unit when the light curtain is broken by a foodstuff on the base.

Thus this most critical of all settings—the vertical spacing between the heating unit and the food being heated—for the salamander is determined accurately and automatically. For most cooking operations a standard spacing is usable, typically between 40mm and 80mm or, more specifically, between 55mm and 65mm, so that this setting is made automatically. Once cooking is complete, which can be timed by the controller also, the heating unit is raised and the user of the device is notified by a buzzer of the like. Instead of the light curtain operating the positioning motor, it can actuate a buzzer or the like to inform the user that the right spacing has been reached.

For more sophisticated positioning of the heating unit another motor is provided for vertically displacing the light curtain independently of the heating unit and thereby varying the spacing therebetween.

This light curtain typically is formed by a 400nm–800nm light source and a vertically extending light-sensitive strip carried on the support and connected to the controller. The light source is fixed on the heating unit beneath same. The motor in this case would displace the light source only. With a single point-type light sensor, both the sensor and the light source would be moved to vary the spacing. In either case if the light sensor gets spattered with grease so it is blinded, the device will go back up and shut off. Similarly if the food being cooked puffs up or starts to burn and emit black smoke, the light curtain will be broken and the device will back up so that it is very safe.

In accordance with a further feature of this invention the base is provided with a rotatable turntable on which the foodstuff is supported and a motor that rotates the turntable about an upright axis. Furthermore the heating unit includes a ceramic heat-radiating plate. The heating unit can also be provided with visible-spectrum lamps energizable to illuminate the foodstuff on the base.

DESCRIPTION OF THE DRAWING

The above and other objects, features, and advantages will become more readily apparent from the following, reference being made to the accompanying drawing in which.

SPECIFIC DESCRIPTION

Figure 1:
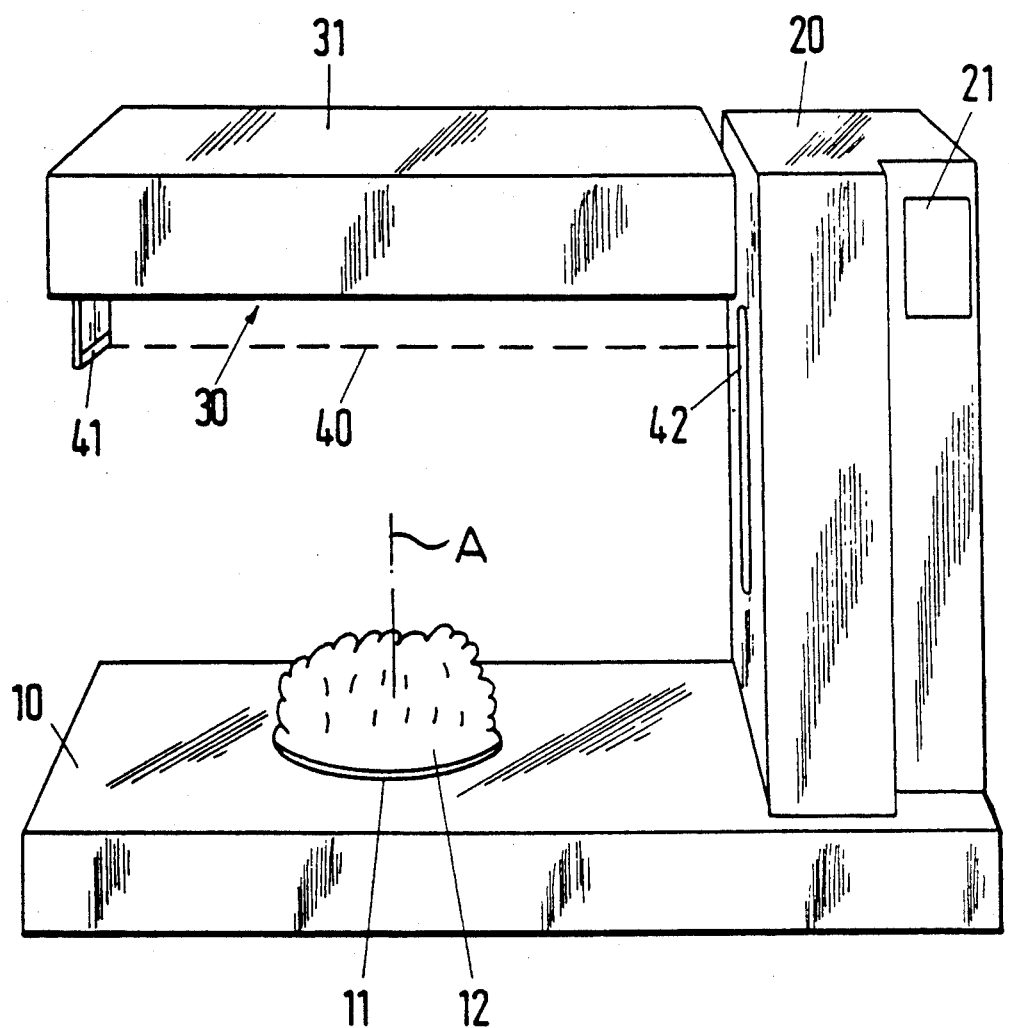
FIG. 1 is a perspective view of a broiler/cooker according to this invention.

As seen in FIG. 1 a salamander-type broiler/cooker has a base 10 on which a turntable 11 supports a foodstuff 12 for rotation about a horizontal axis A adjacent a vertical support column 20. The base 10 can be a broiler-type grill, and all exposed surfaces are made of stainless steel or heavily chromed for protection. Vertically displaceable on the column 20 is a housing 31 containing a halogen-type radiant heating unit 30 with a ceramic plate acting as secondary heat emitter. Depending from the outer end of the housing 31 is a light source 41 having a frequency of between 400nm and 800nm and forming with a strip-type light sensor 42 carried on the column 20 a light curtain 40. A keyboard-type input device 21 of the type whose buttons are covered by a continuous protective membrane is mounted on the column 20 also.

Figure 2:
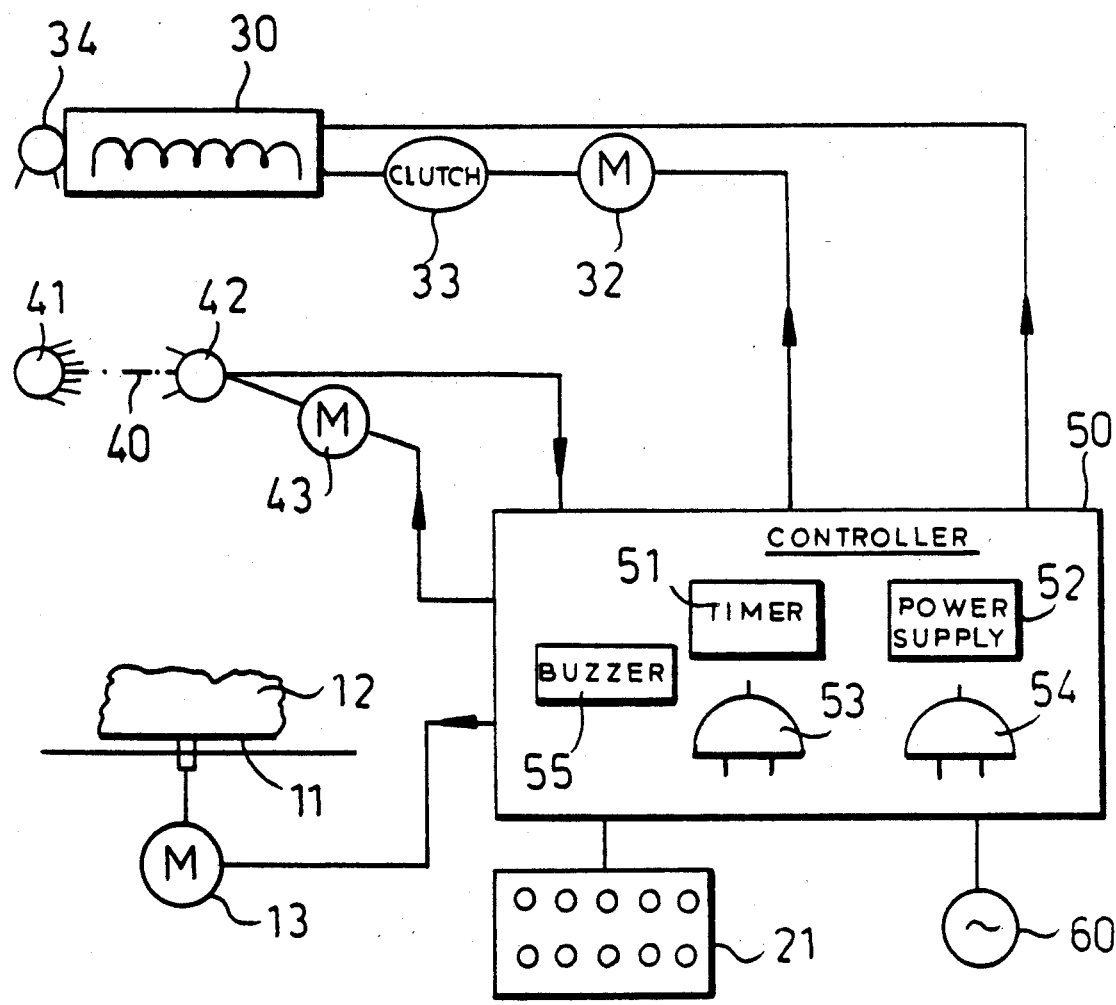
FIG. 2 is a largely diagrammatic and schematic view of another apparatus in accordance with the present invention.

As seen more specifically in FIG. 2 the heating unit 30 can be vertically displaced by a motor 32 connected to it through a clutch 33 and a visible-spectrum light source 34 is connected with the heat unit 30. In addition a motor 13 can operate the turntable 11 and a separate motor 43 can be provided for vertically displacing the light curtain 40 relative to the heating unit 30.

A controller 50 comprising a timer 51 normally having a 30sec–180sec range, a power supply 52, a curtain-position comparator 53, and a heater-position comparator 54 is connected to all of the motors 13, 32, and 43 and is also connected to the input device 21, to the heating element of the unit 30, and to a power source 60. This controller 50 serves for automatic control of the position of the heating unit 30 as well as for how long it operates.

More specifically the user of the apparatus, after putting some foodstuff 12 on the turntable 11, punches in a code indicating the type of cooking to be done, for instance a specific code for rare steak or another for French onion soup. This code in effect feeds set points to the two comparators 53 and 54 for spacing and cooking time. The controller 50 then automatically turns on the heating element of the unit 30, then sets the relative spacing between it and the light curtain 40 to that required by the particular foodstuff, and lowers the unit 30. Once the foodstuff breaks the curtain 40, downward displacement of the unit 30 is arrested and cooking continues for the necessary predetermined time. During this time the light 34 is illuminated so that the user can monitor progress. If the user has accidentally forgotten to put some food into the device, the clutch 33 will prevent the motor 32 from burning out when the heater 30 comes all the way to the bottom without the light curtain 40 being interrupted.

In a system with a fixed spacing between the light curtain 40 and the heating unit 30, as seen in FIG. 1, different spacings can be determined by setting the fixed spacing at the greatest possible distance. The controller 50 then calculates how much further to displace the heating unit 30 downward once the curtain 40 is interrupted when a lesser spacing is selected.

Once the cooking is over the controller 50 automatically raises the device and shuts off the unit 30, at the same time normally also sounding a buzzer 55 or the like to give notice that the cooking operation is over. Meanwhile the controller 50 may maintain some low level of energization of the unit 30 so that the cooked food is held warm.

I claim:

1. A salamander-type overhead broiler/cooker comprising:
    a support;
    a base on the support adapted to support a foodstuff to be heated;
    a heating unit vertically displaceable on the support energizable to radiate heat downward at the support;
    means forming a horizontal light curtain at a predetermined spacing fixed relative to and below the heating unit, whereby the light curtain can be broken by a foodstuff on the base when the unit is lowered;
    heater motor means connected between the unit and the support for vertically displacing the unit and the light curtain on the support; and
    control means connected between the light curtain and the motor means for arresting downward displacement of the unit when the light curtain is broken by a foodstuff on the base.

2. The overhead broiler/cooker defined in claim 1, further comprising:
    light-curtain motor means connected to the light curtain for vertically displacing same independently of the heating unit and thereby varying the spacing therebetween.

3. The overhead broiler/cooker defined in claim 1 wherein the spacing is between 40mm and 80mm and the light curtain is fixed on the heating unit.

4. The overhead broiler/cooker defined in claim 3 wherein the spacing is between 55mm and 65mm.

5. The overhead broiler/cooker defined in claim 1 wherein the light curtain includes:
    a light source, and
    a vertically extending light-sensitive strip carried on the support and connected to the
    control means.

6. The overhead broiler/cooker defined in claim 5 wherein the light source is fixed on the heating unit beneath same.

7. The overhead broiler/cooker defined in claim 1 wherein the base is provided with
    a rotatable turntable on which the foodstuff is supported and
    means for rotating the turntable about an upright axis.

8. The overhead broiler/cooker defined in claim 1 wherein the heating unit includes a ceramic heat-radiating plate.

9. The overhead broiler/cooker defined in claim 1 wherein the heating unit is provided with visible-spectrum lamps energizable to illuminate the foodstuff on the base.

10. A salamander-type overhead broiler/cooker comprising:
    a support;
    a base on the support adapted to support a foodstuff to be heated;
    an upright column projecting upward from the support adjacent the base;
    a heating unit vertically displaceable on the column energizable to radiate heat downward at the support;
    means including a light source depending from the heating unit and a light sensor on the column forming a horizontal light curtain at a predetermined spacing fixed relative to and below the heating unit, whereby the light curtain can be broken by a foodstuff on the base when the unit is lowered;

heater motor means connected between the unit and the support for vertically displacing the unit and the light curtain on the support; and
control means connected between the light curtain and the motor means for arresting downward displacement of the unit when the light curtain is broken by a foodstuff on the base.

* * * * *